United States Patent [19]

Woo

[11] Patent Number: 5,176,943
[45] Date of Patent: Jan. 5, 1993

[54] OPTICAL RECORDING MEDIUM WITH ANTISTATIC HARD COATING

[75] Inventor: Edward J. Woo, Washington, Minn.

[73] Assignee: Minnesota Mining and Manufacturing Company, St. Paul, Minn.

[21] Appl. No.: 727,472

[22] Filed: Jul. 9, 1991

[51] Int. Cl.⁵ .............................. B32B 3/02
[52] U.S. Cl. .......................... 428/64; 428/65; 428/411.1; 428/412; 428/423.1; 428/424.2; 428/461; 428/694; 428/913
[58] Field of Search ............... 428/64, 65, 411.1, 412, 428/423.1, 423.7, 424.2, 461, 694, 913.

[56] References Cited

U.S. PATENT DOCUMENTS

| | | | |
|---|---|---|---|
| 4,042,632 | 8/1977 | Hofer, Sr. et al. | 260/607 |
| 4,208,466 | 6/1980 | Szur | 428/477 |
| 4,505,990 | 3/1985 | Dasgupta | 428/694 |
| 4,623,594 | 11/1986 | Keough | 428/900 |
| 4,822,675 | 4/1989 | Funkenbusch et al. | 428/336 |
| 4,833,043 | 5/1989 | Gardner | 428/694 |
| 4,917,970 | 4/1990 | Funkenbusch | 428/694 |

FOREIGN PATENT DOCUMENTS 57-42741 3/1982 Japan.

Primary Examiner—Patrick J. Ryan
Assistant Examiner—Elizabeth Evans
Attorney, Agent, or Firm—Gary L. Griswold; Walter N. Kirn; David B. Kagan

[57] ABSTRACT

The present invention concerns perfluoro-based antistatic compositions comprising 0.5 to 5.0 parts by weight of an ionic perfluoro surfactant and 0.5 to 5.0 parts by weight of a nonionic perfluoro surfactant in admixture with 100 parts by weight of nonfluorinated, copolymerizable, radiation curable prepolymers as well as antistatic hard coatings prepared from these compositions. The present invention also concerns optical recording media having such antistatic hard coatings provided on at least one surface.

13 Claims, 1 Drawing Sheet

OPTICAL RECORDING MEDIUM WITH ANTISTATIC HARD COATING

FIELD OF THE INVENTION

The present invention concerns perfluoro-based antistatic compositions comprising ionic and nonionic perfluoro surfactants in admixture with nonfluorinated, copolymerizable, radiation curable prepolymers as well as antistatic hard coatings prepared from these compositions. The present invention also concerns optical recording media having such antistatic hard coatings provided on at least one surface.

BACKGROUND OF THE INVENTION

Optical recording media typically comprise an optical recording layer provided on a substrate. For media such as magneto optic recording medium and WORM (write-once-read-many) optical recording media, the optical recording layer is generally comprised of a thin film rare earth transition metal alloy such as gadolinium-cobalt (Gd-Co), gadolinium-iron (Gd-Fe), terbium-iron (Tb-Fe), dysprosium-iron (Dy-Fe), Gd-Tb-Fe, Tb-Dy-Fe, Tb-Fe-Co, terbium-iron-chromium (Tb-Fe-Cr), gadolinium-iron-bismuth (Gd-Fe-Bi), Gd-Co-Bi, gadolinium-iron-tin (Gd-Fe-Sn), Gd-Fe-Co, Gd-Co-Bi, and Gd-Dy-Fe. Such alloys are described, for example, in U.S. Pat. No. 4,822,675. For media such as compact disks, the optical recording layer may be a layer of polycarbonate having a patterned, information-bearing surface.

Many of the materials which are suitable for the optical recording layer react strongly with oxygen and other elements which may be present in the environment in which optical recording media are used. Furthermore, the substrate itself may contain impurities which react with the optical recording layer. Thus, transparent dielectric films may be deposited on one or both sides of the optical recording layer to protect it. Such dielectric films are described, for example, in U.S. Pat. Nos. 4,833,043 and 4,917,970.

Optionally a reflective layer may be incorporated into optical recording media so that incident light that passes through the optical recording layer a first time is reflected and passes back through the optical recording layer a second time. Such reflection increases the magneto optic rotation of incident light because the so-called Faraday effect is added to the so-called Kerr effect. Reflective layers are described, for example, in U.S. Pat. No. 4,822,675.

The reflective layer may be incorporated into a magnetic recording medium such that the optical recording layer is interposed between the substrate and the reflective layer. For such media, transparent substrates are used so that incident light passes first through the substrate, then passes through the optical recording layer, and then is reflected by the reflective layer back through the optical recording layer. Such media are known as substrate incident media. When the optional reflective layer is disposed between the substrate and the optical recording layer, the read and write beams will not be directed through the substrate. Such a medium is known as an air incident medium, although generally there is at least one layer between the optical recording layer and the air.

For substrate incident media, the substrate is typically formed from polycarbonate. Polycarbonate substrates have excellent rigidity, dimensional stability, transparency, and impact strength, but unfortunately have poor abrasion resistance. Consequently, polycarbonate substrates are susceptible to physical damage from scratches, abrading, and the like.

To protect the substrate from physical damage, a "hard coat" layer is coated onto the substrate to form a protective barrier between the substrate and the air. For example, Japanese Kokai No. JP02-260145 describes a hard coat layer that is coated onto the substrate of an optical card. The hard coat layer is formed from an electron-beam or ultraviolet radiation curable resin. The hard coat layer of Japanese Kokai No. JP02-260145 also includes a surface slipping agent, i.e., a lubricant.

Static charge build-up attracts dust to the hard coat layer of optical recording media, which can prevent read and write beams from reaching the optical recording layer during writing or reading. Thus, it is generally desirable to use antistatic agents to reduce this static charge build-up.

Antistatic compositions must satisfy stringent requirements in order to be suitable for use in optical recording media. In addition to providing protection against the build-up of static charge, antistatic compositions must be transparent as well as abrasion resistant and compositionally stable so that the compositions remain transparent for long periods of time. If the compositions become hazy, the amount of incident light that reaches the optical recording layer may be reduced, thus causing an increase in bit error rate, an increase in spare sector, or a loss of data. Another requirement concerns the viscosity of the antistatic composition. To obtain an antistatic coating of uniform thickness, the antistatic composition preferably must have low viscosity, e.g., 100 centipoise or less. The use of heat curable or hot thermoplastic compositions must also be avoided, since higher temperatures, i.e., temperatures of about 100° C. or more, can damage optical recording media and/or adversely affect media performance.

Generally, there are two approaches to using antistatic agents with the hard coat layer. One approach involves coating the antistatic agents directly onto the hard coat layer. This approach, however, generally does not provide long-lasting antistatic protection in that such coatings tend to be easy to wipe away. Another approach involves pre-mixing antistatic agents with the hard coat materials before the hard coat layer is coated onto the media. With this approach, however, the conventional antistatic agents have been used at such relatively high concentrations to provide acceptable antistatic protection that the resulting hard coat layers tend to become hazy over time, show poor abrasion resistance, and delaminate from the media.

Japanese Kokai No. JP57-42741 describes an antistatic composition comprising a nonionic fluoride surfactant and an ionic fluoride surfactant. The antistatic composition may be coated onto a plastic surface by dipping or spraying, or the composition may be pre-mixed in plastics prior to the molding process. According to JP57-42741, suitable plastics include heat curable and thermoplastic materials.

Japanese Kokai No. JP61-000265 describes a coating composition containing a compound having perfluoroalkyl groups at both sides of a ligoethyleneoxide group. The composition is used as a protective coating for solid surfaces, e.g., magnetic tapes or discs.

Japanese Kokai No. JP63-208561 describes perfluorosulphonamides useful as antistatic agents for artificial resins.

Japanese Kokai No. JP62-207352 describes antistatic resin compositions comprising 100 parts by weight of resin and 0.05 to 10 parts by weight of an anionic perfluoro compound.

U.S. Pat. No. 4,208,466 describes the preparation of ionic fluorochemical surfactants that are useful as antistatic agents and lubricants for polymeric shapes. These surfactants may be applied directly to a polymeric shape or compounded with a polymeric material prior to forming.

U.S. Pat. No. 4,623,594 describes an antistatic composition obtained from an electron radiation curable prepolymer and an electron radiation reactive antistatic agent soluble in the prepolymer. Suitable antistatic agents are quaternary ammonium salts such as trialkyletherammonium salts.

U.S Pat. No. 4,505,990 describes antistatic compositions comprising a film-forming synthetic resin and an alkali, alkaline earth, ammonium, or amine salt of a perfluoroalkyl sulfonic acid or carboxylic acid.

SUMMARY OF THE INVENTION

It has now been discovered that combining ionic and nonionic perfluoro surfactants with nonfluorinated, copolymerizable, radiation curable prepolymers provides improved antistatic compositions that are particularly suitable for forming hard coat layers on optical recording media. Preferred antistatic compositions of the present invention are characterized by low viscosity, e.g., 100 centipoise or less. Having low viscosity, the compositions can be easily spin coated onto substrates to form extremely thin, uniform coatings. Being radiation curable, the compositions can be quickly cured using radiation after coating to form abrasion resistant, transparent, compositionally-stable antistatic coatings that remain transparent for long periods of time. Advantageously, curing with heat or the use of hot thermoplastic materials is not required, thus avoiding the higher temperatures that can damage optical recording media. Moreover, after curing, the antistatic coatings of the present invention show excellent adhesion to polycarbonate substrates of optical recording media. As a result, the cured compositions resist delamination, or being wiped away, during the lifetime of the media.

In one aspect, the advantages of the present invention are achieved by an antistatic composition comprising 100 parts by weight of nonfluorinated, copolymerizable, radiation curable prepolymers, from 0.5 to 5.0 parts by weight of a nonionic perfluoro surfactant, and 0.5 to 5.0 parts by weight of an ionic perfluoro surfactant. The antistatic composition forms an abrasion resistant, transparent coating when cured.

In another aspect, the present invention concerns an optical recording medium having an abrasion resistant, transparent antistatic coating provided on at least one surface of the optical recording medium. The antistatic coating is a cured composition obtained from reactants comprising 100 parts by weight of nonfluorinated, copolymerizable, radiation curable prepolymers, 0.5 to 5.0 parts by weight of a nonionic perfluoro surfactant, and 0.5 to 5.0 parts by weight of an ionic perfluoro surfactant.

"Transparent" means that at least 80% of incident light of a desired wavelength or range of wavelengths is transmitted through the coating. The light transmissive characteristics of a coating may be measured using a device such as a UV Spectrophotometer commercially available from Shimatsu, Inc.

"Abrasion resistant" means that the coating remains visually haze-free after 200 cycles of rubbing the coating with a nylon cloth at a weight loading of 1000 grams using a Crockmeter apparatus commercially available from Atlas Electrical Device, Inc. According to this test, an optical recording disk is securely adhered to the platform of the Crockmeter apparatus, while making sure that the disk lies flat and that the edge of the disk lines up with the mark on the platform. A nylon cloth is placed on the arm head and adjusted to be smooth and flat. The cycle number is set at 200 and the apparatus is then operated for 200 cycles. After 200 cycles, the surface of the disk is checked for haze. Generally, the disk is tested twice in 2 perpendicular directions. "Haze-free" means that no band of haze visually appears in the area of the disk where rubbing occurred. Small scratches are acceptable and may occur when the disk is not mounted securely and flat on the platform or when the nylon cloth is wrapped incorrectly on the arm.

DESCRIPTION OF THE PREFERRED EMBODIMENTS

Figure 1:
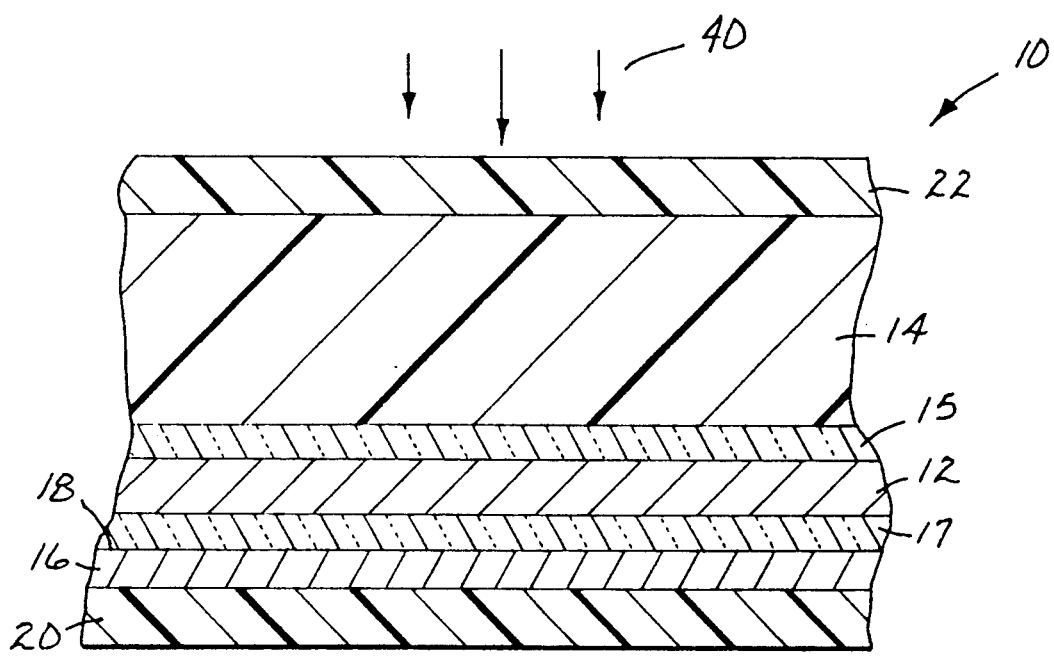
FIG. 1 is a schematic cross-section of a magneto optic recording medium comprising an antistatic coating of the present invention.

FIG. 1 shows a greatly enlarged schematic cross-section through a portion of an illustrative substrate incident magneto optic ("MO") recording disk 10 of the present invention. It is to be understood, however, that the antistatic compositions of the present invention are not limited solely to use on MO media, but rather are suitable for use on a wide variety of materials. For example, in addition to being used with MO disks, the antistatic compositions of the present invention are particularly suitable for use with other kinds of optical recording media such as compact disks, CD-ROM, WORM (i.e., write-once-read-many) media, and the like.

Referring now to FIG. 1, an optical recording layer 12 is provided on a transparent substrate 14. A film 16 having a reflective surface 18 is disposed to reflect incident light 40 which will have been transmitted through the magneto optic layer 12 a first time back through the optical recording layer 12 a second time. A protective sealcoat 20 is disposed over the film 16 to protect the optical recording layer 12 from the environment. Optionally, transparent dielectric layers 15 and 17 may be disposed on one or both sides of the optical recording layer 12. As is known in the art, such dielectric layers enhance the optical signal from the optical recording layer 12 and also protect the optical recording layer 12 from oxidation or corrosion due to heat, humidity, or chemical reactions with impurities. A hard coat layer 22 of the present invention is provided over the substrate 14 to protect the substrate 14 from physical damage.

The substrate 14, optical recording layer 12, film 16, protective sealcoat 20, and the dielectric layers 15 and 17 can be of a type known in the art. See, for example, U.S. Pat. No. 4,917,970. However, the substrate 14 is preferably formed from polycarbonate in that the antistatic compositions of the present invention show excellent adhesion to polycarbonate substrates. A possible rationale for this feature of the invention can be suggested. It is believed that the nonfluorinated, radiation curable, copolymerizable prepolymers, being generally miscible with polycarbonate, tend to migrate into the polycarbonate when coated onto the substrate. As a result, the prepolymers become strongly adhered to the substrate when cured as a result of forming a crosslinked network with the polycarbonate.

The hard coat layer 22 is prepared from a composition comprising 100 parts by weight of non-fluorinated, radiation curable, copolymerizable prepolymers. The prepolymers may be cured using any suitable form of radiation such as electron beam radiation or ultraviolet radiation. It is preferred, however, that the prepolymers are photocurable, i.e., curable with ultraviolet radiation.

Examples of suitable nonfluorinated, radiation curable prepolymers include the ethylenically unsaturated compounds such as acrylic, methacrylic, vinyl, and allyl functional materials. Mixtures of such ethylenically unsaturated materials may also be used in the present invention. Preferably the nonfluorinated, radiation curable prepolymers are acrylate or methacrylate materials, or mixtures thereof. Specific commercially available examples of nonfluorinated, radiation curable, copolymerizable monomers include Gafgard 233 sold by GAF Chemical Corporation, TB3070m sold by Three Bond Chemical Company of America, Inc., and EX704 sold by Dainippon Ink & Chemicals, Inc., Japan. Of these materials, the use of EX704 is preferred.

Preferably, substantially all of the prepolymers are monomeric in form, although polymeric or oligomeric ingredients optionally may also be used. For example, acrylate-terminated polyurethanes or polyurethanes terminated with vinyl groups may be used. However, the use of such polymeric or oligomeric materials tends to increase the viscosity of solutions of the antistatic composition. If the viscosity of solutions of the antistatic composition is too high, i.e., greater than about 200 centipoise, the solution may be unsuitable for use in the spin coating applications discussed below.

The antistatic composition further comprises from 0.5 to 5 parts by weight, preferably 2 to 3 parts by weight of a nonionic perfluoro surfactant, and 0.5 to 5 parts by weight, preferably 2 to 3 parts by weight of an ionic perfluoro surfactant. If less than 0.5 parts by weight of either the nonionic or the ionic perfluoro surfactant is used, the antistatic composition will be unable to effectively protect against static charge build-up. On the other hand, using more than 5 parts by weight of either the nonionic or the ionic perfluoro surfactant provides little additional antistatic protection as compared to using lesser amounts of the surfactant. Additionally using more than 5 parts by weight of either surfactant may also adversely affect the abrasion resistance, transparency, and adhesion characteristics of the resulting antistatic coating. Most preferably, the weight ratio of the nonionic perfluoro surfactant to the ionic perfluoro surfactant is about 1.

Preferably, the perfluoro segment of the nonionic and/or the ionic perfluoro surfactant comprises a straight or branched carbon chain of 4 to 16 carbon atoms, preferably 8 carbon atoms. Most preferably, the perfluoro segment of the nonionic surfactant and/or the ionic perfluoro surfactant is $C_8F_{17}$. Practical tests have shown that nonionic and/or ionic perfluoro surfactants in which the perfluoro segment is $C_8F_{17}$ provide better protection against static charge build-up at comparable weight loadings relative to other nonionic and/or ionic perfluoro surfactants. Most preferably, the perfluoro segment of the nonionic perfluoro surfactant is the same as the perfluoro segment of the ionic perfluoro surfactant.

Examples of nonionic perfluoro surfactants suitable in the practice of the present invention include

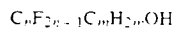

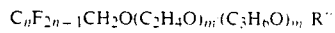

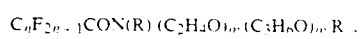

$C_nF_{2n-1}CON(R)(C_2H_4O)_{m'}(C_3H_6O)_{m''}R''$ wherein
n is 4 to 16, preferably 8;
m is 1-20, and preferably 8;
m' is 1-20, and preferably 14;
m" is 0-8;
R is hydrogen or lower alkyl of 1-12 C atoms such as H, $CH_3$, $CH_3CH_2$, and the like; and
R" is hydrogen or lower alkyl of 1-12 C atoms, and preferably is H or $CH_3$.

Examples of ionic perfluoro surfactants suitable in the practice of the present invention include

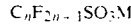

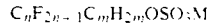

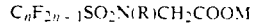

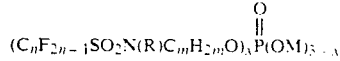

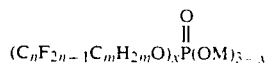

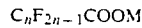

wherein
n is 4 to 16, preferably 8;
M is $Na^+$, $Li^+$, $K^+$, $H^+$, or $NH_4+$, and preferably $Li^+$;
m is 1-10, and preferably 8;
x is 1-3, preferably 1; and
R is hydrogen or lower alkyl of 1-12 C atoms such as H, $CH_3$, $CH_3CH_2$, and the like.

Preferably, the antistatic compositions of the present invention are applied to optical recording media, such as the magneto optic recording disk 10 of FIG. 1, using the spin coating technique. Spin coating allows an extremely uniform hard coat layer having a thickness of only 0.5 to 20 microns, preferably 0.8 to 10 microns, and more preferably 5 to 7 microns, to be easily and quickly formed. Advantageously, such coatings are sufficiently thin so that it is not necessary to match the optical index of the hard coat layer 22 with the optical index of the transparent substrate 14.

According to the spin coating technique, an admixture is prepared comprising the nonfluorinated, radiation curable, copolymerizable prepolymers, the nonionic perfluoro surfactant, the ionic perfluoro surfactant, and optionally a suitable solvent. The use of a solvent is not required. However, use of a solvent is desirable when the surfactants are not miscible with the prepolymers, i.e., the surfactants and the prepolymers form two liquid phases when combined. Examples of suitable solvents include methyl alcohol, isopropyl alcohol, N-vinyl-2 pyrrolidone, mixtures of these solvents, and the like. Of such solvents, a solvent mixture of 10 parts by volume isopropyl alcohol with 1 part by volume n-butanol or isopropyl alcohol by itself is preferred. Preferably, the resulting admixture should include a sufficient amount of solvent such that the solution has a viscosity of 100 centipoise or less, and more preferably of about 5 centipoise. Generally, for isopropyl alcohol, the use of 0.7 to 1.5 grams of solvent per total grams of the nonionic and ionic perfluoro surfactants has been found to be suitable in the practice of the present invention.

The admixture is preferably prepared by first combining the ionic perfluoro surfactant with the solvent, if any. Next, the nonionic perfluoro surfactant is added with stirring. The nonfluorinated, radiation curable, copolymerizable prepolymers are then slowly added and the ingredients are agitated for a time sufficient to obtain a homogeneous solution. Agitation times of 30 minutes have been found to be suitable. After agitation, the admixture should be allowed to stand for at least one hour before use.

The admixture is delivered onto the substrate 14 of the magneto optic disk 10 using a conventional spin coating apparatus. Such an apparatus generally includes a dispensing needle, a syringe, and a pump. Preferably, the magneto optic disk is pre-cleaned with ionized $N_2$ prior to spin-coating. For admixtures having a viscosity of 5 centipoise or less, a needle pressure of 5 to 20 psi delivers a suitable amount of the admixture onto the center of a disk in about 2 seconds when the disk is spinning at 30 to 50 rpm. Preferably, an in-line filter (0.2 to 2 microns) is used to remove particles from the admixture before the admixture is allowed to pass through the dispensing needle. After delivery, a high spinoff speed of 1800 to 2400 rpm for 3 to 5 seconds provides a thin, uniform coating. Most of the solvent, if any is used, is driven off during high speed spin-off. The wet coating should then be immediately cured with a suitable form of radiation, e.g., ultraviolet radiation, at room temperature in an oven fitted with an exhaust fan. Typically, the exhaust fan is operated during curing in order to remove low boiling, volatile components from the oven.

The particular source of radiation is not critical. As one example, a medium intensity UV-arc lamp operating at a wavelength of 280 to 365 nm and an energy of 200 to 450 mj/$cm^2$ for 4 to 6 seconds would be suitable in the practice of the present invention. When the antistatic composition is used with a solvent, it is desirable to let the disk sit for a few seconds in the oven with the exhaust fan on before curing to allow additional solvent to volatilize. Alternatively, such compositions can be cured for longer times, e.g., an additional 2 to 4 seconds, relative to antistatic compositions that have not been combined with a solvent.

For admixtures with a viscosity of greater than 35 centipoise, the same parameters as described above may be used for spin coating. However, the solution should be preheated to 50° to 60° C. prior to coating.

Preferably, spin coating and/or curing occurs in an inert atmosphere. For example, an atmosphere comprising 90% or more nitrogen may be used.

The invention will now be further described with reference to the following examples.

EXAMPLE 1

Several compositions (Samples 1-18) of the present invention were prepared by combining a nonionic perfluorosurfactant of the formula

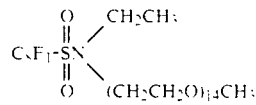

an ionic perfluoro surfactant of the formula

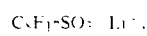

and non fluorinated, copolymerizable, radiation curable prepolymers (TB3070M, a solution of prepolymers having 30% solids commercially available from Three Bond Chemical Company of America, Inc.) in amounts according to Table I:

TABLE I

| | (all units are parts by weight) | | |
|---|---|---|---|
| Sample | Prepolymers[1] | Nonionic Surfactant | Ionic Surfactant[2] |
| 1 | 100 | 2.5 | 2.5 |
| 2 | 100 | 3.8 | 1.3 |
| 3 | 100 | 2.0 | 3.0 |
| 4 | 100 | 3.0 | 2.0 |
| 5 | 100 | 0.5 | 0.5 |
| 6 | 100 | 1.0 | 1.0 |
| 7 | 100 | 1.5 | 1.5 |
| 8 | 100 | 2.5 | 2.5 |
| 9 | 100 | 0.5 | 4.5 |
| 10 | 100 | 4.5 | 0.5 |
| 11 | 100 | 1.0 | 4.0 |
| 12 | 100 | 4.0 | 1.0 |
| 13 | 100 | 1.5 | 0.5 |
| 14 | 100 | 1.5 | 1.0 |
| 15 | 100 | 0.5 | 1.5 |
| 16 | 100 | 1.0 | 1.5 |
| 17 | 100 | 0.5 | 2.5 |
| 18 | 100 | 2.5 | 0.5 |

[1] Although the prepolymers were obtained from a 30% solids solution, the parts by weight in this table refers to the actual amount of prepolymer solids that were used.
[2] Although the ionic perfluoro surfactant was obtained from a 40% solution, the parts by weight in this table refers to the actual amount of ionic perfluoro surfactant that was used.

To prepare Samples 1-18, 40 g of the ionic perfluoro surfactant was slowly dissolved in 60 g of isopropyl alcohol with stirring to prepare a 40% solution of the ionic perfluoro surfactant. For each sample, an appropriate amount of this solution was combined with the nonionic perfluoro surfactant with stirring. After his, the 30% solid solution of prepolymers was combined with the surfactants, and the resulting admixture was agitated for 30 minutes. The sample was allowed to stand for 1 hour, after which the sample was coated onto a polyethylene terephthalate film using a No. 3 Meyer Bar. The coating was then cured using ultraviolet radiation at a wavelength of 365 nm and an energy of 240 mj/cm$^2$ for 4 to 5 seconds. Curing took place in a nitrogen atmosphere at a temperature in the range from 50° C. to 60° C.

EXAMPLE 2

A sample (Sample 19) of the present invention was prepared in accordance with Example 1, except that $CF_3SO_3^-Li^-$ was used in place of $C_8F_{17}SO_3^{-Li-}$ as follows:

| Sample | Prepolymers | Nonionic Surfactant | Ionic Surfactant |
|---|---|---|---|
| 19 | 100 | 2.5 | 2.5 |

EXAMPLE 3

A sample (Sample 20) of the present invention was prepared in accordance with Example 1, except that $C_4F_9SO_3^{-Li-}$ was used in place of $C_8F_1SO_3^-Li^-$ as follows:

| Sample | Prepolymers | Nonionic Surfactant | Ionic Surfactant |
|---|---|---|---|
| 20 | 100 | 2.5 | 2.5 |

EXAMPLE 4

A sample (Sample 21) of the present invention was prepared in accordance with Example 1, except that EX704, a 100% solids admixture of nonfluorinated, copolymerizable, radiation curable prepolymers available from Dainippon Ink and Chemicals, Inc. was used in place of TB3070M as follows:

| Sample | Prepolymers | Nonionic Surfactant | Ionic Surfactant |
|---|---|---|---|
| 21 | 100 | 2.5 | 2.5 |

The viscosity of this sample was measured using a Brookfield viscometer with a UL adaptor and determined to be 43 to 45 centipoise at 25° C. and a rotational speed of 12 rpm.

COMPARISON EXAMPLE A 5 g of the nonionic perfluoro surfactant of Example 1 was slowly added to 300 g of TB3070 with stirring. The solution was allowed to stand for 1 hour before being coated onto a PET film in accordance with Example 1.

COMPARISON EXAMPLE B 40 g of $CF_3SO_3^-Li^-$ was slowly dissolved in 60 g of isopropyl alcohol with the help of stirring. Then, 3.8 g of this solution was added to 100 g of TB3070M with stirring. The solution was allowed to stand for 1 hour before being coated onto a PET film in accordance with Example 1.

COMPARISON EXAMPLE C

The same procedure as Comparison Example B was followed except that $C_8F_{17}SO_3^-Li^-$ was used in place of $CF_3SO_3^-Li^-$.

COMPARISON EXAMPLE D

The same procedure as Comparison Example B was followed except that $C_4F_9SO_3^-Li^-$ was used in place of $CF_3SO_3^-Li^-$.

COMPARISON EXAMPLE E

The same procedure as Example 1 was followed except that only 0.25 parts by weight of each surfactant was used per 100 parts by weight of prepolymer solids.

EXAMPLE 5

The antistatic properties of Samples 1-21 were compared to the antistatic properties of Comparison Examples A-E. Additionally, the antistatic properties of a PET film coated only with TB3070M (Comparison Example F) and an uncoated PET film (Comparison Example G) were also measured. Each sample was charged to about 5000 volts and the time in seconds for the charge to decay to 50 volts was measured. These measurements were made at 25° C. and 15% relative humidity. An ETS406C meter available from Electro Tech System, Inc. was used to monitor the charge decay. Each sample had a size of 3.5 inches by 5.5 inches. The results were as follows:

TABLE II

| Sample | Charge decay (seconds) |
|---|---|
| 1 | 0.8 |
| 2 | 1.3 to 1.5 |
| 3 | 0.5 to 0.76 |
| 4 | 0.21 |
| 5 | 1.36 to 1.58 |
| 6 | 1.2 to 3.2 |
| 7 | 0.7 to 0.8 |
| 8 | 2.9 to 3.1 |
| 9 | 0.3 |
| 10 | 5.63 to 5.78 |
| 11 | 0.64 |
| 12 | 0.1 |
| 13 | 1.2 |
| 14 | 0.3 |
| 15 | 0.58 |
| 16 | 0.3 |
| 17 | 0.36 to 0.42 |
| 18 | 0.81 |
| 19 | 51 to 66 |
| 20 | 12 to 36 |
| 21 | 2.4 to 5.0 |
| A | INFINITE* |
| B | INFINITE |
| C | INFINITE |
| D | INFINITE |
| E | INFINITE |
| F | INFINITE |
| G | INFINITE |

*In this table, "INFINITE" means that, after 1 hour, the residual voltage of the sample was greater than 50 volts. For all samples for which the charge decay was INFINITE, the residual voltage of the sample after 1 hour was at least 2000 volts.

EXAMPLE 6 a. Sample 22

An antistatic composition was prepared by slowly dissolving 40 grams of the ionic perfluoro surfactant of Example 1 into 60 grams of isopropyl alcohol with the help of stirring. Then, 40 grams of the nonionic perfluoro surfactant of Example 1 was added into the isopropyl alcohol solution with the help of stirring. The total weight percent of the perfluoro surfactants in the solution was around 57%. Next, 8.7 grams of the isopropyl alcohol solution of the perfluoro surfactants was slowly added into 100 grams of EX704. The solution was agitated on a shaker table for 30 minutes to mix thoroughly. After agitation, the solution was allowed to stand for one hour before any use.

b. Sample 23

An antistatic composition was prepared by slowly dissolving 40 grams of the ionic perfluoro surfactant of Example 1 into 60 grams of isopropyl alcohol with the help of stirring. Next, 40 grams of the nonionic perfluoro surfactant of Example 1 was added into the isopropyl alcohol solution with the help of stirring. The total weight percent of the perfluoro surfactants in the solution was around 57%. Next, 8.7 grams of the isopropyl alcohol solution of the perfluoro surfactants was slowly added into 300 grams of TB3070M. The solution was then agitated on a shaker-table for 30 minutes to mix thoroughly, and the mix solution was then allowed to stand for 1 hour before any use.

Each of Samples 22 and 23 was then spin-coated onto a magneto optic recording disk as follows. The magneto optic recording disk was precleaned with an ionized $N_2$ gun prior to coating. The sample was then spincoated onto the polycarbonate side of the magneto optic recording disk at a low air pressure (5 to 20 psi) using a needle dispensing system and an in-line (0.2 to 2 microns filter). The sample was dispensed onto the center of the disk at low rpm (30 to 50 rpm) first, and a subsequent high spin-off speed (1800 to 2400 rpm) was used to achieve a smooth uniform coating. The coated disk was then cured by low intensity UV light (365 nm) under a nitrogen atmosphere. Sample 22 had a relatively high viscosity at room temperature and was preheated to 50° C. to 60° C. prior to spincoating.

For comparison purposes, two additional disks were each coated only with EX704 (Comparison Sample I) and TB3070 (Comparison Sample J), respectively, using this spincoating process. For Comparison Samples I and J, no perfluoro surfactants were used.

Each of the disks coated with these samples (22, 23, I, and J) was aged in a chamber at 80° C. and 85% relative humidity. Every 500 hours, the disks were removed and tested for byte error rate by randomly testing 5% of the total memory capacity of each disk. The disks were also tested for abrasion resistance as well as visually inspected for haze and delamination prior to aging and after 1500 hours of aging. The results for the byte error rate testing were as follows:

TABLE III*

| Sample | t = 0 | t = 500 | t = 1000 | t = 1500 | % Change |
|---|---|---|---|---|---|
| 22** | 1.3 | 1.2 | 1.5 | 2.1 | 75 |
| 23 | 0.9 | 1.3 | 1.5 | 2.3 | 150 |
| I | 0.7 | 1.0 | 1.9 | 4.3 | 500 |
| J | 0.8 | 0.0 | 1.1 | 1.9 | 120 |

*values are expressed as the number of errors per 100,000 bytes
**values for Sample 22 are reported as an average of two trials The results of the abrasion resistance testing and the visual inspection were as follows:

TABLE IV

| Sample | t = 0 | | t = 1500 | |
|---|---|---|---|---|
| | abrasion | visual | abrasion | visual |
| 22 | excellent* | good** | excellent | good |
| 23 | good | good | good | good |
| I | excellent | good | excellent | good |
| J | good | good | good | good |

*"excellent" means no scratches were visually observed
**"good" means some scratches, but no haze, were visually observed Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. An optical recording disk having an abrasion resistant, transparent antistatic hard coat layer provided on at least one surface of the disk, wherein the hard coat layer is a cured composition obtained form ingredients comprising
   (a) 100 parts by weight of nonfluorinated, copolymerizable, radiation curable prepolymers;
   (b) from 0.5 to 5.0 parts by weight of a nonionic perfluoro surfactant; and
   (c) from 0.5 to 5.0 parts by weight of an ionic perfluoro surfactant.

2. The optical recording disk of claim 1, wherein the nonionic perfluoro surfactant comprises a perfluoro segment of 4 to 16 carbon atoms.

3. The optical recording disk of claim 2, wherein the perfluoro segment of the nonionic perfluoro surfactant is $C_8F_{17}$.

4. The optical recording disk of claim 1, wherein the nonionic perfluoro surfactant is

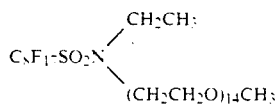

5. The optical recording disk of claim 1, wherein the ionic perfluoro surfactant comprises a perfluoro segment of 4 to 16 carbon atoms.

6. The optical recording disk of claim 5, wherein the perfluoro segment of the ionic perfluoro surfactant is $C_8F_{17}$.

7. The optical recording disk of claim 1, wherein the ionic perfluoro surfactant is $C_8F_{17}SO_3{}^-Li^-$.

8. The optical recording disk of claim 1, wherein the hard coat layer comprises from 2 to 3 parts by weight of the nonionic perfluoro surfactant per 100 parts by weight of the prepolymers.

9. The optical recording disk of claim 1, wherein the hard coat layer comprises from 2 to 3 parts by weight of the ionic perfluoro surfactant per 100 parts by weight of the prepolymers.

10. The optical recording disk of claim 1, wherein the ionic perfluoro surfactant has a perfluoro segment that is the same as the perfluoro segment of the nonionic perfluoro surfactant.

11. The optical recording disk of claim 10, wherein the perfluoro group of both surfactants is $C_8F_{17}$.

12. The optical recording disk of claim 1, wherein the hard coat layer has a thickness of 1 to 5 microns.

13. The optical recording disk of claim 1, wherein the weight ration of the nonionic perfluoro surfactant to the ionic perfluoro surfactant is about 1:1.

* * * * *

UNITED STATES PATENT AND TRADEMARK OFFICE
CERTIFICATE OF CORRECTION

PATENT NO. : 5,176,943
DATED : January 5, 1993
INVENTOR(S) : Edward J. Woo It is certified that error appears in the above-identified patent and that said Letters Patent is hereby corrected as shown below:

Title page: Inventor: "Edward J. Woo, Washington, Minn." should be --"Edward J. Woo, Woodbury, Minn.--.

Col. 8, line 67, "his," should be --this,--.

Col. 12, line 66, "ration" should be --ratio--.

Signed and Sealed this

Twenty-third Day of November, 1993

Attest:

BRUCE LEHMAN

Attesting Officer    Commissioner of Patents and Trademarks